Nov. 28, 1967   W. L. SLAUGHTER   3,354,524
CASKET TOP AND METHOD OF MANUFACTURE
Filed Sept. 3, 1964
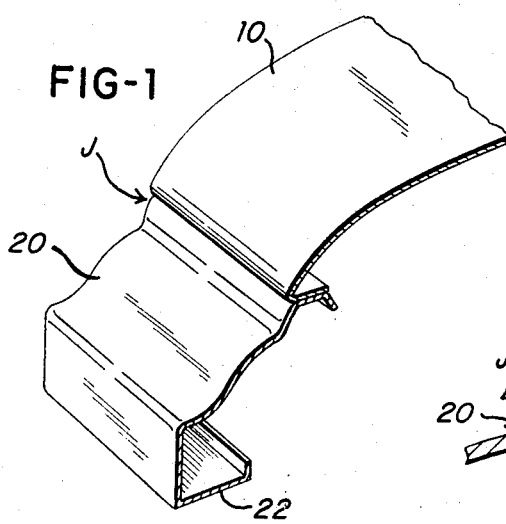
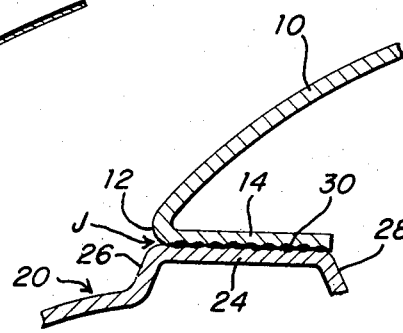
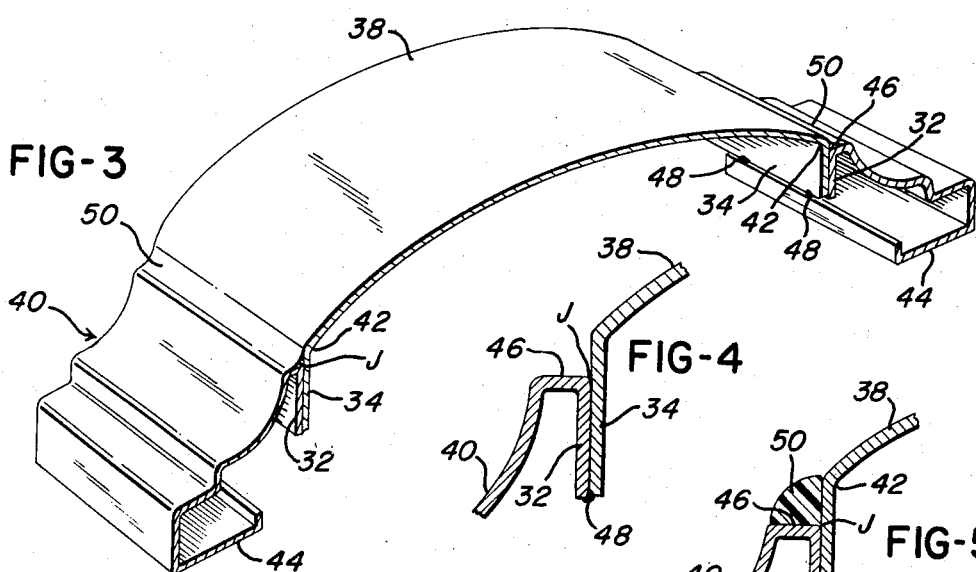
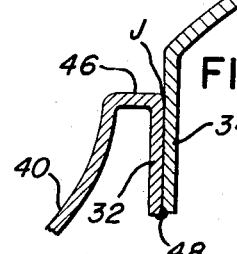
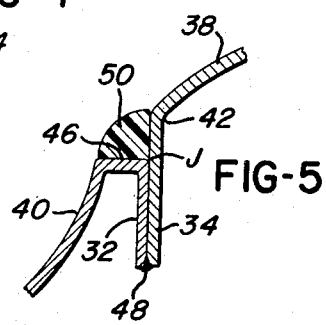
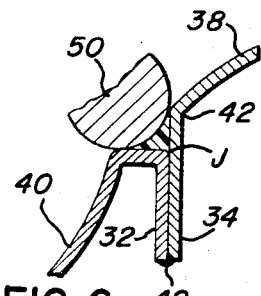
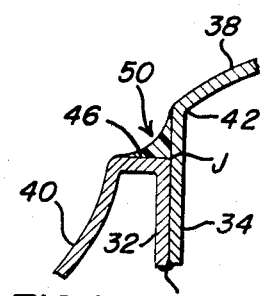
INVENTOR.
WILLIAM L. SLAUGHTER
BY
*Kinney and Schenk*
ATTORNEYS

United States Patent Office 3,354,524
Patented Nov. 28, 1967

3,354,524
CASKET TOP AND METHOD OF MANUFACTURE
William L. Slaughter, Cincinnati, Ohio, assignor to The Crane & Breed Casket Company, Cincinnati, Ohio, a corporation of Ohio
Filed Sept. 3, 1964, Ser. No. 394,207
4 Claims. (Cl. 27—17)

ABSTRACT OF THE DISCLOSURE

A simulated one-piece casket top is formed by hermetically joining a separately formed base member to a separately formed cap member along endless, face-contacting vertical flanges of the respective members. The flanges are joined by spaced welds and the joint between the face-contacting surfaces is hermetically sealed by a plastic filler of the class of epoxy resin. The filler is placed exteriorally along the joint and molded to conform to the outer surface of the top.

---

This invention relates to a burial casket top, and to a method of manufacture thereof.

A primary objective in the production and sale of burial caskets, is to emphasize and ensure complete security of encasement of the contents. In furtherance of this end, caskets are commonly provided with elaborate sealing means, and structurally strong components designed to withstand pressure and entry of water, air, insects and the like.

As one of the means for achieving the objective stated above, caskets have been furnished with one-piece metallic tops stamped and otherwise formed by means of large presses, the operation being quite expensive and attended by difficulties in working the metal to avoid fracture and extensive malformation.

An object of the present invention is to provide an improved casket top and method of manufacturing same, which eliminates many of the manufacturing difficulties, yet provides all the advantages and appearances of a one-piece top, although the top is in fact constructed in two parts.

Another object of the invention is to materially enhance the strength of a casket top by fabricating same in two parts, whereby to maintain the gage thickness of the metal better and to a substantially greater degree than is possible when a complete, one-piece-top is drawn from a single sheet of metal.

A further object of the invention is to provide in a two-piece casket top, a simulated one-piece construction which is simple and effective for its purposes, yet inexpensive to fabricate with substantial savings of time and labor.

Another object is the production of simulated one-piece casket tops which under pressure and vacuum factory tests, will invariably prove leak-proof, so that rejects in manufacture are a rarity.

The foregoing and other objects are attained by the means described herein and illustrated upon the accompanying drawings, in which:

FIGS. 1 and 2 are fragmentary cross-sections of a two-piece casket top as commonly constructed.

FIG. 3 is a fragmentary cross-section in perspective, showing the improved construction of the present invention.

FIG. 4 is a fragmentary cross-sectional enlargement of the unfinished cap and base joint characterizing the improved construction of FIG. 3.

FIG. 5 is a view similar to FIG. 4, showing the joint in an initial stage of treatment with a filler.

FIG. 6 is a similar view, showing an advanced stage of joint treatment.

FIG. 7 is a similar view, showing the joint in finished condition.

With reference to FIGS. 1 and 2, the numeral 10 denotes a central dome-shaped cap of pressed metal, which is inturned peripherally at 12 to provide a lip 14 extending uninterruptedly around the cap. The numeral 20 denotes a one-piece rectangular frame element or lid base, having a continuous inturned flange 22 adapted to rest upon and seal against the upper continuous body rim of a casket, not shown.

The upper inwardly directed margin of the lid base is commonly developed to provide a continuous mounting flange 24, upon which rests the lip 14 of the cap in flatwise contact, so that flange 24 and lip 14 may be joined together flatwise over a large area by means of extensive welding indicated at 30. The weld not only extends transversely of lip 14 as shown, but is applied continuously along the circumferentiating length of the lip and flange 24. This involves a great deal of careful welding in order to preclude leakage of air and water all around the joint J between cap 10 and base 20. The connection thus made is required to withstand twist and other strains imposed during handling, assembly, and finishing of the casket top. Usually, the flange 24 is reinforced more or less for rigidity by providing it with upturned and downturned bends 26 and 28, respectively, which define the lateral extent of flange 24.

That which has been described above is fairly representative of common practice in the fabrication of two-piece casket tops. The attending welding procedure is expensive, and must be expertly performed in order to seal joint J. Moreover, since flanges 14 and 24 are disposed in the mean plane of the casket top, the flanges have little effect to oppose bending of the top transversely of its length.

In the preferred construction of FIGS. 3 to 7, the flanges 32 and 34 of the base and the cap, respectively, are inclined to the mean plane of the casket top, and therefore resist bending of the top transversely. In these views, the cap is denoted 38, and the base 40. The flange 34 of cap 38 is substantially perpendicular to the mean plane of the cap, and may be formed by bending downwardly a peripheral margin of the cap metal. The bend, indicated at 42, is not as severe as the bend at 12 of FIG. 2, and is therefore easier to form in fabricating the top.

Base member 40 has the usual sealer flange 44 to overlie a casket body rim, and the uppermost inner margin of the base is by preference turned in substantial parallelism with flange 44 to form a circumferential exterior ledge 46 from which the mounting flange 32 depends at an approximate right angle. Mounting flange 32 is therefore approximately perpendicular to the mean plane of the lid base 40, and may be continuous to define the inner frame dimensions of the base.

Flange 32 in assembly of the lid, abuts flatwise the flange 34 of the cap, and may be joined to flange 34 by means of spaced welds 48 applied easily and quickly to the lowermost edges of said flanges, without considering water-tightness and air-tightness of the joint there made. Thus, the cap and base may be initially assembled with ease and dispatch, without employment of skilled labor. The initial assembly results in formation of an exterior continuous joint J around the casket lid, FIG. 4.

As illustrated by FIG. 5, joint J is then subjected to a filling operation which covers the continuous joint, the filler 50 being applied along ledge 46 and against a portion of flange 34. Filler 50 by preference is a rapidly-setting plastic material which enters joint J and bonds to the adjacent contacting surfaces for producing an air-tight and water-tight seal which is practically indestructible. A satisfactory filler for the purpose may be one of the tenacious epoxy-type resins or plastic adhesives characterized by high bondability and imperviousness to air and water upon setting. As FIG. 5 indicates, an excess of filler may be applied to the joint, so that the excess may be formed or shaped according to FIGS. 6 and 7 complementarily to the casket lid design. In FIG. 6, the numeral 52 denotes a forming tool or implement which may be utilized in shaping the filler, either before or after complete hardening or setting of the filler material. The finished joint is illustrated by FIGS. 3 and 7.

Upon shaping of filler 50 to a desired or specified configuration, the casket lid is ready for finishing by the application of suitable paints, varnishes and the like. Thus, the completed casket lid simulates a one-piece lid, however, it is substantially stronger and more rigid than a one-piece lid by reason of the proper re-inforcing and rigidifying effect which results from the upright disposition and interconnection of flanges 32 and 34, and the use of the epoxy-type resin filler at joint J.

As was pointed out previously herein, assembly of the improved casket lid is greatly simplified and expedited by utilizing the method herein disclosed, and substantial savings are effected in the welding, handling, and labor costs involved.

It is to be understood that various modifications and changes may be made in the structural details of the device, within the scope of the appended claims, without departing from the spirit of the invention.

What is claimed is:

1. A simulated one-piece casket top comprising in combination: a base member and a separate cap independently formed; said base member comprising an open frame having a lower sealer area to overlie a casket body rim, and an upper portion defining the frame opening; a mounting flange depending from said upper portion inside the frame opening and extended downwardly at substantial right angles to the mean plane of the base member; a ledge disposed exteriorly of the base member marginally of the mounting flange; a depending flange on the cap extended substantially at right angles to the mean plane of the cap, said cap flange being disposed in flatwise abutment against the mounting flange of the base member, with the cap flange extending above the level of the ledge to form therewith a pair of angularly related wall surfaces a plastic joint filler applied along the ledge and against the portion of the cap flange extending above the ledge; and means securing the cap flange to the base member flange in flatwise abutting relationship.

2. The device as set forth in claim 1, wherein the securing means for the flanges being constituted of a series of spaced welds applied to said flanges at locations remote from the ledge of the base member.

3. The method of fabricating a simulated one-piece casket top, comprising the steps of providing a base member part and a separate cap part of formed sheet metal, each of said parts having a flange depending substantiallly at right angles to the mean plane of their respective parts; securing the flanges of said parts in flatwise abutment one against the other, with a portion of the cap flange exposed above the base member flange exteriorly of the casket top, thereby to provide a joint flanked by a pair of meeting areas marginally of the joint; applying to said joint and the adjacent meeting areas a quantity of quick-setting epoxy resin in excess of that required to seal the joint; shaping the excess in conformity with the base member design; then applying a surface finish to the resin covering the joint.

4. The device as set forth in claim 1, wherein said ledge and said portion of the cap flange extending above the ledge are substantially of the same width.

References Cited

UNITED STATES PATENTS

| 1,475,756 | 11/1923 | Duval | 27—35 |
| 2,205,110 | 6/1940 | Stone | 27—14 X |
| 2,677,633 | 5/1954 | Gross | 220—81 X |
| 2,864,640 | 12/1958 | Mattinson | 27—17 X |
| 3,208,188 | 9/1965 | Fulton et al. | 27—35 X |

RICHARD A. GAUDET, *Primary Examiner.*

W. E. KAMM, *Assistant Examiner.*